United States Patent
Majcen

(10) Patent No.: US 6,168,161 B1
(45) Date of Patent: Jan. 2, 2001

(54) ROTARY VALVE SHAFT SEAL

(75) Inventor: Robert M. Majcen, Westmont, IL (US)

(73) Assignee: Val-Matic Valve & Manufacturing Corp., Elmhurst, IL (US)

(*) Notice: Under 35 U.S.C. 154(b), the term of this patent shall be extended for 0 days.

(21) Appl. No.: 09/140,410

(22) Filed: Aug. 26, 1998

(51) Int. Cl.[7] .................................................. F16J 15/18
(52) U.S. Cl. .................. 277/308; 277/511; 277/530; 411/165; 411/539; 411/535; 411/546
(58) Field of Search .................... 277/510, 511, 277/530, 308; 411/546, 535, 536, 539, 165; 206/345, 346, 347

(56) References Cited

U.S. PATENT DOCUMENTS

| | | | |
|---|---|---|---|
| 1,963,800 | * 6/1934 | Olson | 411/165 |
| 2,295,583 | * 9/1942 | Jordan | 411/165 |
| 2,649,125 | * 8/1953 | Poupitch | 411/165 |
| 3,385,341 | * 5/1968 | Garstkiewicz | 411/165 |
| 4,512,586 | * 4/1985 | Smith | 277/530 |
| 4,538,790 | * 9/1985 | Williams et al. | 277/530 |
| 4,697,786 | 10/1987 | Kennedy . | |
| 4,809,421 | * 3/1989 | Justice | 29/525.1 |
| 4,863,144 | 9/1989 | Wilson . | |
| 5,129,625 | * 7/1992 | Wood et al. | 277/530 |
| 5,230,498 | * 7/1993 | Wood et al. | 277/530 |
| 5,478,048 | 12/1995 | Salesky et al. . | |
| 5,620,290 | * 4/1997 | Homfeldt et al. | 411/533 |

* cited by examiner

Primary Examiner—B. Dayoan
Assistant Examiner—Alison K. Pickard
(74) Attorney, Agent, or Firm—Sonnenschein Nath & Rosenthal

(57) ABSTRACT

A shaft seal having spacers positioned between the packing follower and the body of a valve. The spacers are flat, hard members of a certain thickness which allow maximum tightening of the packing fasteners and determine the maximum pressure the packing follower exerts on the packing material. The spacers have a slot for accommodating the fasteners and a tab that can easily be grasped with a tool, such as pliers. A stack of spacers can be positioned between the packing follower and valve body and then sequentially removed to provide incremental tightening of the fasteners for maintaining pressure on the packing materials by the packing gland. The spacers may include integral locking tabs.

20 Claims, 2 Drawing Sheets

ROTARY VALVE SHAFT SEAL

BACKGROUND OF INVENTION

1. Field of Invention

The present invention relates generally to rotary valves and more particularly to a rotary valve with an improved shaft seal. Rotary valves such as plug and butterfly valves have been in common use in the water and wastewater industries for over 75 years. Rotary valves have a rotating element or shaft that penetrates the body of the valve. Various operating mechanisms such as hand levers, gear actuators, or power actuators are connected to the rotating shaft to drive the valve open, closed, or hold it in an intermediate position. A shaft seal is required to prevent fluid media from escaping the pressure boundary of the valve or pipeline via the opening in the body where the shaft penetrates. There are many types of seals such as O-rings, U-cups, rope packings, or V-type packings to name a few. Historically, valves and pumps have been equipped with rope packing which requires constant pressure from a gland ring and regular adjustment to prevent leakage.

One embodiment of the current invention relates specifically to the application of V-type packing used in rotary valves. V-type packing is relatively new (i.e. 30 years) in some rotary valve applications. One characteristic of V-type packing is that it is wear compensating, which means that as it is worn due to rubbing and friction with the rotating shaft, it flexes outward further to effect a seal. Another characteristic of V-type packing is that it is self-energizing. The V-shaped rings are pushed outward by internal pressure and provide a tight seal due to the force against the shaft and the outside wall of the bearing bore. Hence, V-type packing differs from the historical rope packing in that it does not require regular adjustment.

Historically though, users of valves have been trained to adjust packing regularly because of the once common use of rope packing. While packing adjustment is needed on rope type packing, over adjustment of V-type packing can have damaging consequences. If V-type packing is over adjusted, the V-rings will wear prematurely and excess shaft friction will develop. The current invention is designed to prevent over adjustment of the packing gland by the user who is not aware of the correct application of V-type, or other, packing. Further, the invention allows simple adjustment of the follower several years down the road should excessive wear cause leakage.

DESCRIPTION OF RELATED ART

Rotary valves such as plug and butterfly valves may be used in any application which involves the flow of fluids (including gasses and particulates) through a closed system, especially a closed system under pressure.

Some traditional rotary valve seals are shown in U.S. Pat. Nos. 4,863,144 and 4,697,786. The '144 patent shows a rigid packing gland, with no means of adjustment, as part of an eccentric plug valve. The '786 patent shows an eccentric plug valve with a more traditional packing follower secured to the valve cap by fasteners which may be adjusted over time.

As shown in the '786 patent, a typical rotary valve has a valve body defining a valve chamber. The valve body includes a valve cover through which a shaft extends to a valve plug within the valve chamber. The shaft is guided on journal bearings and a seal is provided by packing material in the annular space between the shaft and valve body. A packing follower is provided to hold the packing material in place and is fastened to the body by fasteners. The current art allows for the packing follower to be fastened down against the packing until the user judges that sufficient force is exerted on the packing. However, threaded fasteners can exert extreme forces on the packing causing premature wear and increased friction on the shaft. Further, wear over time may require that the fasteners be adjusted after a certain period of use to compensate for lost packing. In either event, the user is required to judge the degree of tightening necessary and many users are unlikely to make this judgment in accord with the optimum performance of the particular packing material.

U.S. Pat. No. 5,478,048 describes a number of the possible shapes of packing materials for use in a rotary shaft seal. Specifically, the '048 patent discusses graphite V-type packing and various ring adapters for placement at the top or bottom of the ring stack, as well as packing with cross-sections that are truncated-wedge shapes or arcuate in shape. The '048 does not contemplate the differences in required packing maintenance for the new packing configurations and materials.

Another problem of prior art followers and fasteners is that they are subject to loosening as a result of vibration in certain applications. Vibration is a common occurrence because of flow turbulence and valve operation. Loosening of the fasteners and relaxation of the pressure from the packing follower to the packing can easily result in losing the seal and may require further tightening maintenance.

SUMMARY OF THE INVENTION

An object of the present invention is to provide an improved rotary shaft seal by placing one or more slotted spacers between the packing follower and the valve body. The slotted spacers allow the fasteners to be tightened to the full strength of the fastener while the actual pressure on the packing material is controlled by the factory prescribed spacers. The length of the follower portion of the packing follower, the height of the packing, the depth of the cover bore, and the thickness and quantity of the spacers control the initial compression of the packing.

Another object of the present invention is to provide a plurality of spacers in small thickness increments so that the removal or insertion of one spacer will provide a small increment of difference in compression on the packing. Depending on the shaft size, the quantity of the spacers can be set at the factory to provide a preset amount of adjustment over the life of the valve. All the user is required to do is remove a spacer at intervals predetermined by the factory and re-tighten the fasteners.

Another object of the present invention is to provide a spacer that is easy to use and manufacture. The spacer includes an inside slot which is marginally larger than the outside diameter of the fastener so that the spacer can be pulled out from under the packing follower without removing the fastener. The spacer provides a tab which protrudes beyond the packing follower so that the spacer can be extracted from under the packing gland with a simple tool such as pliers. The spacer is further designed to contain opposite symmetry along a straight line in jig saw like precision so that the parts can be economically fabricated from strip metal with minimal waste.

Another object of the present invention is to provide a locking mechanism for the spacers to prevent loosening of the fasteners in applications subject to vibration. Locking tabs within the spacer slot prevent rotation and decrease the likelihood of the fasteners backing out of the valve body.

One embodiment of the invention is a rotary shaft seal assembly with a shaft extending from a chamber through a body. Packing material is disposed in the annular space between the shaft and the body to provide a seal. A follower member is connected to the body by threaded fasteners and applies pressure to the packing material to maintain the seal. The amount of pressure exerted is adjusted by rotating the threaded fastener. At least one spacer is positioned between the follower member and the body to determine the maximum pressure which the follower member can exert on the packing when the threaded fastener is fully tightened.

The assembly can also include a valve body and a plug member at the end of the shaft within the chamber so that the assembly acts as a plug valve and the shaft can be rotated to vary the fluid flow through the chamber.

Some specific examples of packing material may be a V-type set including a top adapter, a bottom adapter, and at least one v-shaped ring or one or more rings of rectangular or V-shaped packing.

A plurality of spacers of substantially small thickness may be provided so that the number of spacers can be varied to adjust the maximum pressure exerted by the follower member. The spacer itself can be a hard, flat member with a U-shaped slot which fits around the threaded fastener. The spacer also has a tab where a tool may grasp the spacer to remove it from between the body and the follower member. The edges of the spacer are complementary in shape so that a plurality of spacers can be arranged first edge to second edge and be cut from a single sheet with minimal waste material. The spacer can be made of a corrosion resistant metal to be suitable for long term use.

Another embodiment of the invention is the spacer for use with a threaded fastener between two bodies. The spacer is a hard, flat member with a slot for accommodating a threaded fastener and has a tab so it can be grasped with a tool.

The threaded fastener slot may be U-shaped. The spacer may have complementary edges such that a plurality of spacers can be arranged edge to edge and cut from a single sheet of material with minimal waste. The spacer may also have a plurality of locking tabs extending from the interior edges of the slot to provide a locking mechanism to prevent loosening of the threaded fastener. The spacer may be made of corrosion resistant metal, have a thickness of approximately 0.020 inches, and a plurality of them can be stacked together to form a predetermined thickness.

Still another embodiment of the invention is the method of maintaining a rotary shaft seal. The method requires a rotary shaft seal assembly with a body, a shaft extending through the body, packing material disposed in an annular space between the body and the shaft to provide the seal, a follower member positioned to exert pressure on the packing material, and at least one threaded fastener connecting the follower member to the body. A predetermined number of substantially thin flat spacers are positioned between the follower member and the body. The threaded fastener is tightened but the predetermined number of spacers determine the maximum pressure which can be exerted on the packing material by the follower member.

The method may also include removing a spacer member and re-tightening the threaded fastener at regular intervals in accordance with a maintenance schedule until all spacers are removed. Removing the spacers may involve using a tool to grasp the tabs extending from the spacers.

DETAILED DESCRIPTION OF THE PREFERRED EMBODIMENTS

Figure 1:
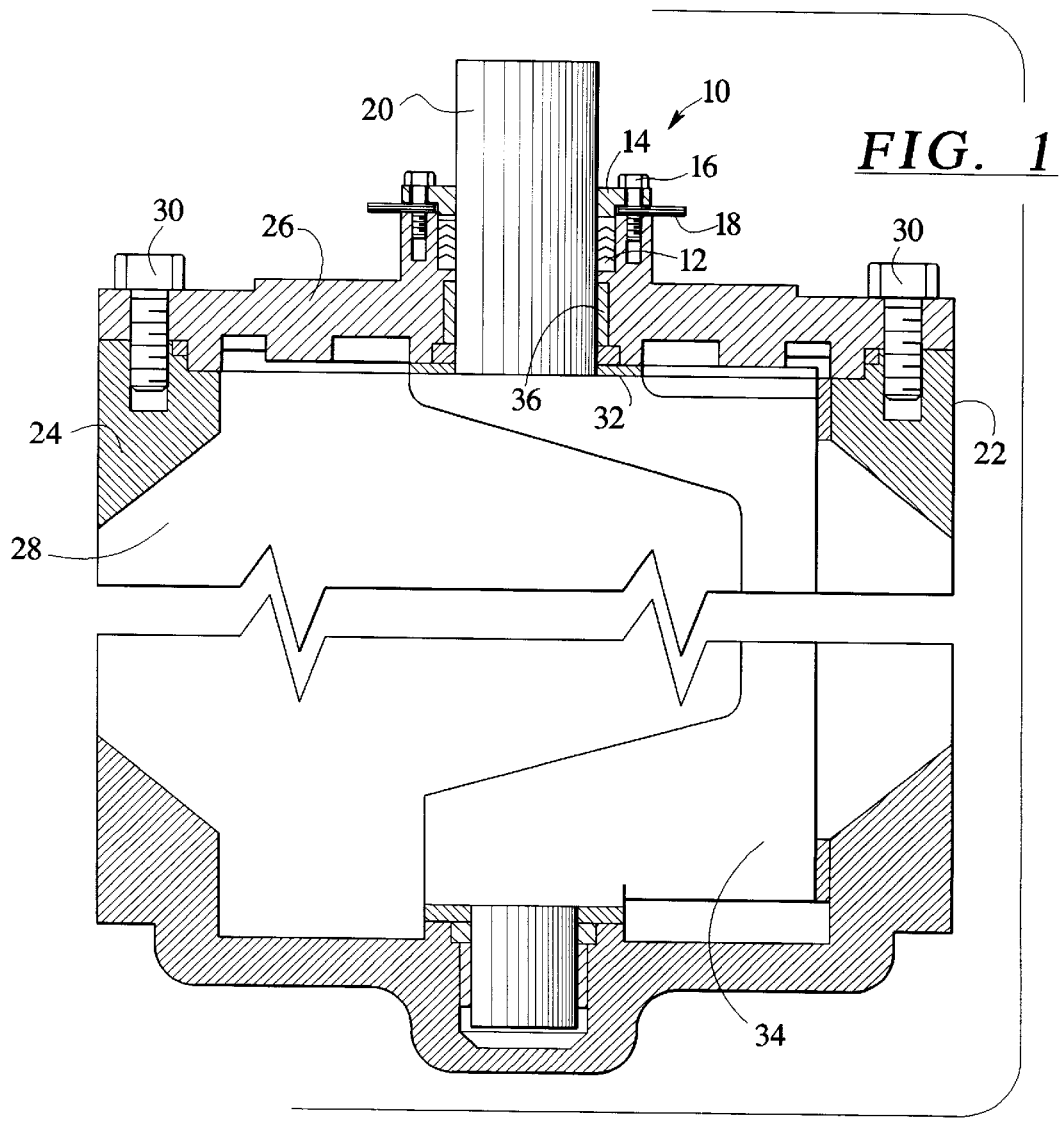
FIG. 1 is a cross-section of a rotary shaft seal for a plug valve.

In FIG. 1 of the drawings, a preferred embodiment of the invention is shown as a rotary shaft seal 10 for a plug valve. The rotary shaft seal 10 may be used in any fluid handling device (i.e. plug valves, butterfly valves, globe valves, etc.) or any device with fluid contents under pressure which has a shaft 20 extending through a body 22.

The rotary shaft seal 10 is a ring of packing material 12 positioned in the annular space between the shaft 20 and the body 22. Packing material 12 is held in place by a follower member 14 which is secured to the body 22 by one or more threaded fasteners 16. A stack of spacers 18 are located between the follower member 14 and the body 22 to regulate the maximum pressure which can be applied to the packing material 12 through the follower member 14 by tightening the threaded fasteners 16. Any number of spacers may be included in the space between the body 22 and the follower member 14. The packing material 12 forms a seal around the shaft 20 due to the compression supplied by the follower member 14 which is translated into lateral pressure between the packing material 12, the shaft 20, and the body 22.

In a typical plug valve, the body 22 is comprised of a cylindrical container 24 and a cover 26 defining a chamber 28. The cover 26 is fastened to the container 24 by a plurality of threaded fasteners 30. A plug 34 is positioned within the chamber 28 at the end of the shaft 20 and engages with a thrust bearing 32. The shaft 20 passes through the cover 26 through an opening surrounded by journal bearings 36. Beyond the journal bearings 36, the shaft 20 passes through the rotary shaft seal 10. The rotary shaft seal 10 is formed between the cover 26 and the shaft 20. The follower member is most likely a packing gland or gland ring which serves to apply compressive force to the packing material. A typical packing gland is a rigid ring which is attached to the cover 26 by a number of threaded fasteners 16. While only two fasteners are shown in the cross-sectional view, any number may be used depending on the size and design specifications of the valve.

Figure 2:
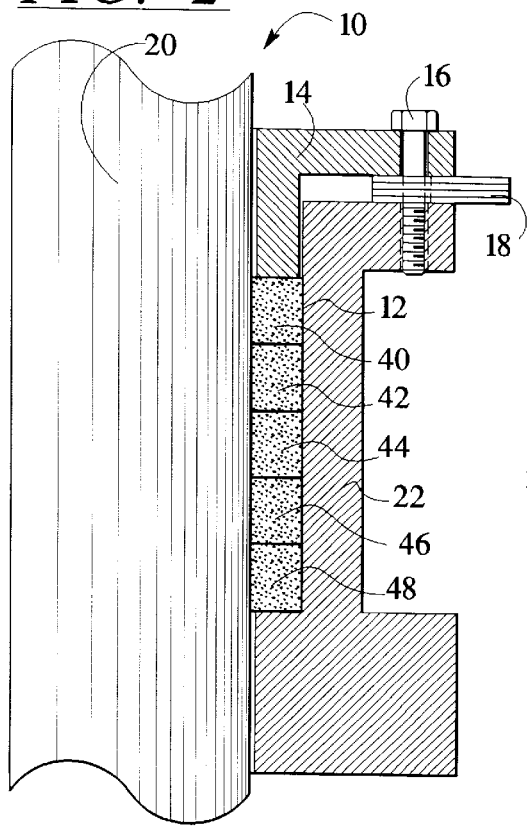
FIG. 2 is a cross-section of a rotary shaft seal with rectangular packing.
Figure 3:
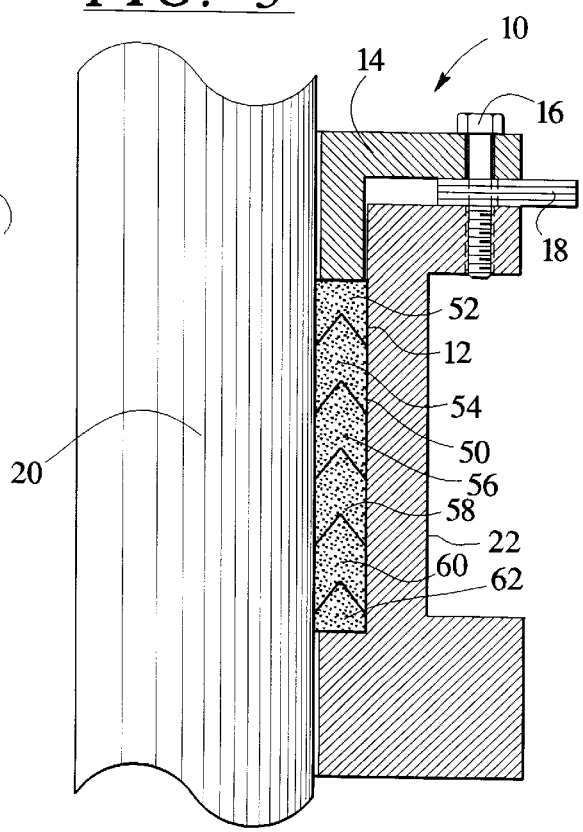
FIG. 3 is a cross-section of a rotary shaft seal with V-type packing.

FIGS. 2 and 3 show cross-sections of the rotary shaft seal 10 with different shaped packing materials, rectangular packing and a V-type set. Other possible cross-sectional shapes include: square, truncated-wedge shaped, arcuate shaped, U-shaped, W-shaped, and rope shaped (the cross-section of a ring of braided fibers). The rectangular packing is composed of a plurality of rings 40, 42, 44, 46, and 48 each having a substantially rectangular cross-section. The V-type set 50 includes a top adapter 52, intermediate V-shaped rings 54, 56, 58, and 60, and a bottom adapter 62.

The follower member 14 places compressive pressure on the packing material, which in turn causes the packing material to place lateral pressure on the shaft 20, which maintains the seal. After time, friction between the packing material and the moving shaft, as well as natural aging, causes packing material to recede or be lost. If lateral pressure on the shaft is lost then the seal may be broken. A benefit of V-type packing is that it is self-energizing which means that less compressive force is required to produce sufficient lateral pressure. V-type packing can withstand greater wear before requiring further tightening of the follower member to maintain compressive force.

Figure 4:
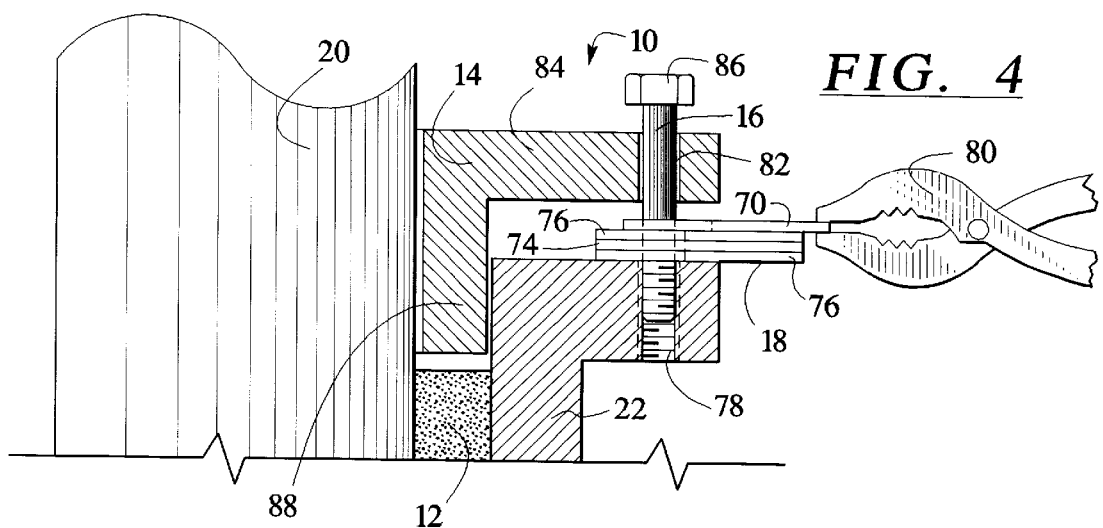
FIG. 4 is a cross-section of a rotary shaft seal wherein one of the spacers is being removed from the stack using a tool.

FIG. 4 shows the operation of removing a single spacer 70 from the stack of spacers 18. The stack of spacers 18 is composed of a plurality of individual spacers 70, 72, 74, and 76. An initial number of spacers are provided between the follower member 14 and body 22. The plurality of individual spacers are each of a small thickness, such as approximately 0.020 inches, such that the plurality provides a substantially greater thickness. The thickness of the spacers determines the maximum pressure which can be applied to the packing material by tightening the threaded fastener 16. As wear occurs (as described above) and the potential for the seal to be compromised increases, individual spacers, such as the spacer 70, can be removed to incrementally increase the amount which the threaded fastener 16 may be tightened. As shown, the threaded fastener 16 may be backed out of a hole 78 in the body 22. A tool 80, such as pliers, may be used to grasp one of the spacers and pull it from between the follower member 14 and the body 22. The threaded fastener 16 may then be re-tightened to provide greater compressive force to the packing material 12.

The threaded fastener 16 extends through a hole 82 in a flat upper portion 84 of the follower member 14. When the threaded fastener 16 is tightened, a head 86 applies pressure to the area of the upper portion 84 immediately surrounding the hole 82. The threads of the threaded fastener 16 engage the threads of the hole 78 in the body 22. As the follower member 14 is brought closer to the body 22 (up to the minimum distance allowed by the spacers 18), pressure is applied to the packing material 12 through the lower portion 88 of the follower member 14. A lower portion 88 of the follower member 14 extends into the annular space between the shaft 20 and the body 22 to engage the top surface of the packing material 12 when the threaded fastener 16 is tightened.

Figure 5:
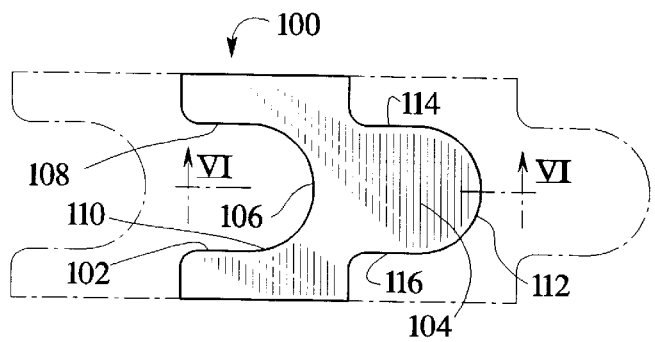
FIG. 5 is a spacer with dashed lines showing how a plurality of spacers may be formed from a continuous strip.
Figure 6:
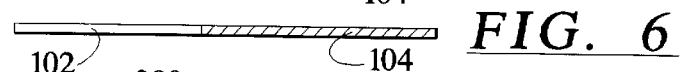
FIG. 6 is a magnified cross-section of the spacer of FIG. 5 along line VI—VI.

FIG. 5 shows an overhead view a spacer 100. FIG. 6 shows a cross-section of the spacer 100 shown in FIG. 5. The spacer 100 is a flat member composed of a suitably hard material such as a corrosion resistant metal. The spacer 100 has a slot 102 and a tab 104. The U-shaped slot 102 is defined by the interior edges of the spacer 100 and has a curved or bight portion 106 and two parallel edges 108 and 110. The tab 104 extends from the spacer 100 away from the slot 102 such that the tab 104 will protrude beyond the follower member when used in a shaft seal assembly. The tab 104 provides a portion that can be grasped by a person or a simple tool as shown by the tool 80 and the spacer 70 in FIG. 4. The tab 104 has a curved outer edge 112 and two parallel outer edges 114 and 116 such that the tab 104 of one spacer can fit inside the slot 102 of a second spacer. The dashed lines in FIG. 5 show how the first edge of one spacer is complementary to the second edge of another spacer such that a plurality of spacers can be arranged tab-to-slot and thus cut from a single continuous sheet with minimal waste materials. The spacer 100 is of a substantially small thickness, such as 0.020 inches, such that a number of such spacers may be stacked together to form a predetermined thickness and may be removed sequentially to incrementally decrease the total thickness of the stack.

Figure 7:
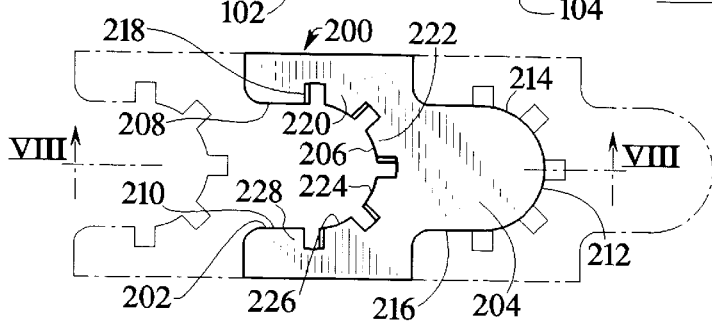
FIG. 7 is an alternate spacer embodiment with locking tabs and dashed lines showing how a plurality of spacers may be formed from a continuous strip.
Figure 8:
FIG. 8 is a magnified cross-section of the spacer of FIG. 7 along line VIII—VIII.

FIG. 7 shows an alternate embodiment of a spacer 200 with locking tabs. FIG. 8 is a cross-sectional view of the spacer 200 of FIG. 7. The spacer 200 is a flat member composed of a suitably hard material such as a corrosion resistant metal. The spacer 200 has a slot 202 and a tab 204. The U-shaped slot 202 is defined by the interior edges of the spacer 200 and has a curved or bight portion 206 and two parallel edges 208 and 210. The tab 204 extends from the spacer 200 away from the slot 202 such that the tab 204 will protrude beyond the follower member when used in a rotary shaft seal. The tab 204 provides a portion that can be grasped by a person or a simple tool as shown by the tool 80 and the spacer 70 in FIG. 4. The tab 204 has a curved outer edge 212 and two parallel outer edges 214 and 216 such that the tab 204 of one spacer can fit inside the slot 202 of a second spacer. The dashed lines in FIG. 7 show how the first edge of one spacer is complementary to the second edge of another spacer such that a plurality of spacers can be arranged tab to slot and thus cut from a single continuous sheet with minimal waste materials. Spacer 200 is of a substantially small thickness, such as 0.020 inches, such that a number of such spacers may be stacked together to form a predetermined thickness and may be removed sequentially to incrementally decrease the total thickness of the stack. The interior edge of the slot 202 further has a plurality of locking tabs 218, 220, 222, 224, 226, and 228 formed from notching the interior edge of the slot 202 and bending the resulting tab edges. These locking tabs prevent rotation of a threaded fastener when the spacers are in use. Because many rotary valve seals are exposed to vibration which could cause rotation and in turn cause the threaded fastener to loosen, the locking tabs provides an added safety feature to prevent the seal from being compromised by insufficient pressure from the follower member.

The invention provides a unique method of maintaining a rotary shaft seal when there is a rotary shaft seal assembly including a body containing a pressurized fluid with a shaft passing through that body, packing material disposed in the annular space between the shaft and the body for maintaining a seal, and a follower member exerting force on the packing material and attached to the body by at least one threaded fastener. As shown in FIGS. 2–3, a predetermined number of spacers 18 must be positioned between the follower member 14 and the body 22. The threaded fastener is then tightened so that the thickness of the predetermined number of spacer members determines the maximum pressure that follower member 14 exerts on the packing material 12. As shown in FIG. 4, single spacers can then be removed sequentially, with or without loosening the threaded fastener, and the threaded fastener can be re-tightened. Removal of a spacer can be easily achieved by using a simple tool, like pliers (tool 80), to engage the tab portion of a spacer. This provides incremental tightening of the threaded fastener and allows the user to slightly increase the pressure exerted by the follower member 14 to compensate for wear and deterioration of the packing material 12. The incremental tightening of the threaded fastener by removing spacers can even be done at regular intervals according to a factory determined schedule.

While the foregoing has described several preferred embodiments of the invention, it should be understood by those skilled in the art that many modifications and changes may be made without straying from the essential nature and true scope of the invention as embodied in the claims.

What is claimed is:

1. A rotary shaft seal assembly comprising:
   a body defining a chamber;
   a shaft extending from said chamber through said body;
   a packing material disposed in an annular space between said shaft and said body, said packing material providing a seal between said shaft and said body;
   a follower member detachably connected to said body and positioned to exert pressure on said packing material;
   at least one threaded fastener detachably connecting said follower member to said body, whereby the pressure exerted on said packing material is adjusted by rotating said threaded fastener; and
   a predetermined number of stacked spacers arranged to be clamped between said follower member and said body whereby a stacked thickness of said spacers determines a maximum pressure which said follower member exerts on said packing material.

2. The assembly of claim 1, wherein said body comprises a valve body and said shaft connects to a plug member within said chamber, whereby said shaft is rotated to vary the flow of a fluid through said chamber.

3. The assembly of claim 1, wherein said packing material comprises a top adapter, a bottom adapter, and at least one ring with a substantially V-shaped cross-section.

4. The assembly of claim 1, wherein said packing material comprises at least one ring with a cross-section substantially of a shape chosen from: rectangular and V-shaped.

5. The assembly of claim 1, wherein said at least one spacer member comprises a plurality of spacers of substantially small individual thickness, whereby the number of spacers is varied to adjust the maximum pressure which said follower member exerts on said packing material.

6. The assembly of claim 1, wherein said at least one spacer comprises a substantially flat member of a substantially hard material and has a U-shaped interior edge defining a slot having a width greater than a diameter of said threaded fastener.

7. The assembly of claim 6, wherein said at least one spacer further comprises a tab extending beyond said follower member, whereby said tab provides a portion for engaging a tool to remove said spacer.

8. The assembly of claim 6, wherein said spacer has a first edge and a second edge, said first edge having a shape complementary to said second edge, whereby a plurality of said spacers arranged first edge to second edge are cut from a sheet with minimal waste material.

9. The assembly of claim 6, wherein said spacer has a plurality of locking tabs extending from said interior edge, whereby said locking tabs provide a locking mechanism to prevent loosening of said threaded fastener.

10. The assembly of claim 1, wherein said spacer is configured so as to at least partially surround said threaded fastener and to be inserted and removed from between said follower member and said body without disassembly of said threaded fastener.

11. A spacer for use with a threaded fastener between two bodies comprising:
    a substantially flat member of a substantially hard material having an interior edge defining a slot for accommodating a threaded fastener; and
    a tab extending from said flat member whereby said tab provides a portion for engaging a tool to said spacer;
    said spacer having a first edge and a second edge, said first edge having a shape complementary to said second edge, whereby a plurality of said spacers arranged first edge to second edge are cut from a continuous sheets with no waste material between said edges of adjacent spacers.

12. The spacer of claim 11, wherein said interior edge is U-shaped and the width of said slot is marginally greater than a diameter of a threaded fastener.

13. The spacer of claim 11, wherein said spacer further comprises a plurality of locking tabs extending from said interior edge whereby said locking tabs provide a locking mechanism to prevent loosening of a threaded fastener.

14. The spacer of claim 11, wherein said spacer comprises a corrosion resistant metal.

15. The spacer of claim 11, wherein said flat member has a thickness of approximately 0.020 inches.

16. The spacer of claim 11, wherein a plurality of said spacers are stacked together to form a predetermined thickness.

17. A method of maintaining a rotary shaft seal comprising the steps of:
    providing a rotary shaft seal assembly comprising a body, a shaft extending through said body, packing material disposed in an annular space between said body and said shaft to provide a seal, a follower member positioned to exert pressure on said packing material, and at least one threaded fastener connecting said follower member to said body;
    positioning a predetermined number of substantially flat spacers to be clamped between said follower member and said body by said threaded fastener; and
    tightening said threaded fastener, whereby a stacked thickness of said predetermined number of substantially flat spacers determines the maximum pressure exerted on said packing material by said follower member when said threaded fastener is fully tightened.

18. The method of claim 17, wherein the method further comprises the steps of removing a spacer and re-tightening said threaded fastener.

19. The method of claim 18, wherein the steps of removing a spacer and re-tightening said threaded fastener are repeated at regular intervals in accordance with a maintenance schedule until all spacers are removed.

20. The method of claim 18, wherein the step of removing a spacer comprises using a tool to engage a tab extending from said spacer.

* * * * *